US005243744A

United States Patent [19]

Nilsson

[11] Patent Number: 5,243,744

[45] Date of Patent: Sep. 14, 1993

[54] MACHINE FOR PRODUCING VENETIAN BLINDS AND PUNCHING DEVICE THEREFOR

[75] Inventor: Berndt R. Nilsson, Malmö , Sweden

[73] Assignee: AB Sani-Maskiner, Malmo, Sweden

[21] Appl. No.: 877,774

[22] Filed: May 4, 1992

[30] Foreign Application Priority Data

May 8, 1991 [SE] Sweden .............................. 9101411

[51] Int. Cl.[5] .............................. B23P 19/04

[52] U.S. Cl. .............................. 29/24.5

[58] Field of Search .............................. 29/24.5, 433, 241

[56] References Cited

U.S. PATENT DOCUMENTS 3,824,657 7/1974 Nilsson .............................. 29/24.5
4,665,599 5/1987 Nilsson .............................. 29/24.5
5,060,353 10/1991 Nilsson .............................. 29/24.5
5,127,138 7/1992 Lim .............................. 29/24.5

FOREIGN PATENT DOCUMENTS 323501 5/1970 Sweden .
323787 8/1970 Sweden .
339097 9/1971 Sweden .
361915 11/1973 Sweden .
441941 10/1985 Sweden .
458379 3/1989 Sweden .

*Primary Examiner*—Timothy V. Eley
*Attorney, Agent, or Firm*—Shapiro and Shapiro

[57] ABSTRACT

In a machine for producing venetian blinds, a strip of slat material is intermittently fed by a feeding device to a mounting station where slats (20, 20') are mounted in a number of ladder tapes (17) at threading stations (12). Punching devices (30) for punching the strip of slat material comprise, respectively a punching tool (30) which is movable laterally relative to longitudinal direction of the strip of slat material between an operative position in which the die (32) and punch (33) of the punching tool are in the correct position for punching the strip of slat material, and an inoperative position in which the die and punch of the punching tool are positioned laterally outside the strip of slat material. The punching devices can have at least one cutoff or separating punching tool for cutting or separating individual slats (20) from the strip of slat material. A moving or driving mechanism (40–42) moves each punching tool between the operative position and the inoperative position.

25 Claims, 10 Drawing Sheets

MACHINE FOR PRODUCING VENETIAN BLINDS AND PUNCHING DEVICE THEREFOR

BACKGRTOUND OF THE INVENTION

The present invention relates to a machine for producing venetian blinds and a punching device therefor. The development of venetian blind production machines has been going on for many years, and as examples of prior-art technique mention can be made of Swedish Patents SE-B-323,787, SE-B-323,501, SE-B-339,097, SE-B-361,915 (U.S. No. 3,824,657), SE-B-441,941 (U.S. No. 4,665,599 and EP-B-0,182,805) and SE-B-458,379 (U.S. No. 5,060,353 and EP-A-0,331,657). A common feature of this type of machines for producing venetian blinds is that they comprise a feeding device for intermittently feeding from a slat material supply station a strip of slat material (normally a metal strip) in the longitudinal direction thereof through a number of ladder tapes at threading stations, and punching devices for punching the strip of slat material. In prior-art machines, the ladder tape holes have been punched at separate punching stations where the strip of slat material has been stopped before being finally introduced into a mounting station where the strip of slat material has been inserted in a number of ladder tapes that are to be included in the finished venetian blind. In older machines, it was necessary to use long machine beds where the punching devices intended for the ladder tape holes have been arranged at a punching station before the actual mounting station. An improvement of these machines is represented by Swedish Patent SE-B-441,941 in which a cutting station is positioned between two neighboring mounting stations, thereby making it possible to manufacture at least two venetian blinds simultaneously. There are also examples of machines in which the strip of slat material is advanced by small steps for successive punching of the ladder tape holes. These machines suffer from the drawback that they are slow because of the repeated stops of the advancing of the strip of slat material in each punching operation.

The improved machines have several advantages as compared to older technique, but there is a disadvantage in that the machines must have long machine beds, and that the strip of slat material therefore need be transported over long distances through the machine, before it is finally mounted in the ladder tapes at the mounting station.

SUMMARY OF THE INVENTION

One object of the present invention is to provide a venetian blind production machine and a punching device which make it possible to shorten the machine bed, while maintaining the machine capacity. A further object of the invention is to provide a punching device for the above-mentioned machine. One more object of the invention is to provide a machine for producing venetian blinds in which the punching and ladder tape folding operations can be efficiently coordinated. A further object of the invention is to provide a venetian blind production machine and a punching device which can punch ladder tape holes adjacent or at each ladder tape folding station. One more object of the invention is to provide a venetian blind production machine whose punching tools are movable between an operative and an inoperative position, the punching tool in its operative position straddling the strip of slat material and, in its inoperative position, being in a position laterally outside the strip of slat material.

In short, the invention thus relates to a machine for producing venetian blinds, comprising a feeding device for intermittently feeding a strip of slat material from a slat material supply station to a mounting station where the slats of the intended venetian blind are mounted in a number of ladder tapes at threading stations. This machine is provided with punching devices for punching the strip of slat material. The punching devices comprise a punching tool which is laterally movable relative to the longitudinal direction of the strip of slat material between an operative position in which the die and punch of the punching tool are in the correct position for punching the strip of slat material, and an inoperative position in which the die and punch of the punching tool are positioned laterally outside the strip of slat material. Preferably, the reciprocating punching tools are mounted adjacent the threading stations of the venetian blind production machine. In a preferred embodiment, the punching devices comprise punching tools for punching lift cord holes. In one more preferred embodiment, the punching device also comprises at least one cutoff or separating punching tool for cutting or separating individual slats from the strip of slat material.

The invention also relates to a punching device for a venetian blind production machine, said punching device comprising a punching tool having a die and punch for punching or cutting a strip of slat material for the forming of slats. This punching device comprises a moving or operating mechanism for moving the punching tool between an operative position in which the die and punch thereof are in the correct position for punching the strip of slat material, and an inoperative position in which the die and punch of the punching tool are positioned laterally outside the strip of slat material.

BRIEF DESCRIPTION OF THE DRAWINGS

The invention will now be described in more detail with reference to the accompanying drawings in which.

DESCRIPTION OF THE PREFERRED EMBODIMENTS

Figure 1:
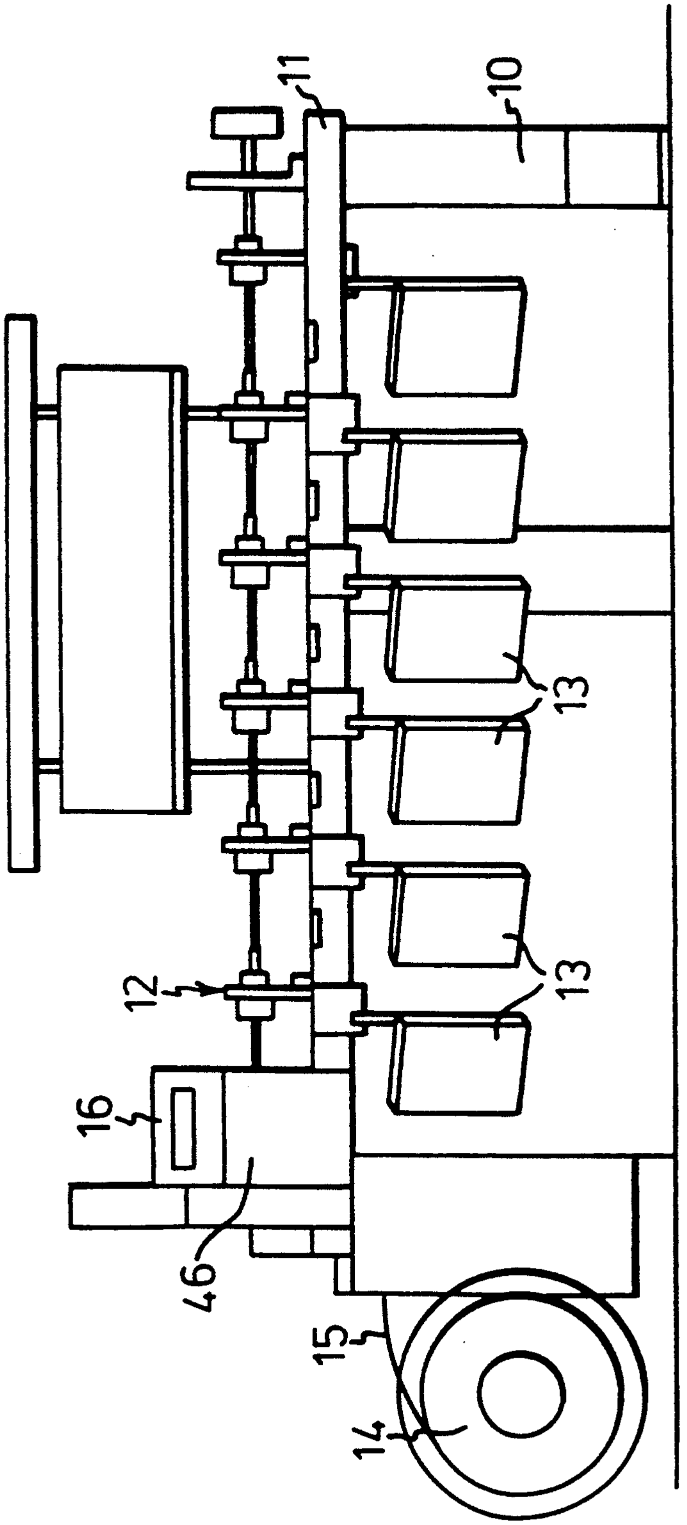
FIG. 1 is a diagrammatic side view of a machine according to the present invention.

FIG. 1 is a diagrammatic side view of a machine for producing venetian blinds. The machine comprises a frame 10 supporting a bed 11. Ladder tape threading stations 12 are arranged along the bed 11. These stations can be movable along the bed according to e.g. Swedish Patent Specification SE-B-458,379 (U.S. No. 5,060,353 and EP-A-0,331,657) which is incorporated in this specification by reference. Adjacent the threading stations there are ladder tape stores or magazines 13 from which ladder tapes are pulled upwards in a manner which will be described below. The machine comprises a slat material supply station in the form of a supply reel 14 from which a strip of slat material 15 is unwound during operation of the machine. The slat material can be a strip of metal, plastic, fabric, wood or paper and is advanced along the machine bed by driving means 46 which are not shown in detail. These driving means may be designed as described in Swedish Patent Specification SE-B-441,941 (U.S. No. 4,665,599 and EP-B0,182,805) which is also incorporated in this specification by reference. The machine also comprises in a per se known manner a numerical control means 16 for controlling the various functions of the machine.

Figure 3:
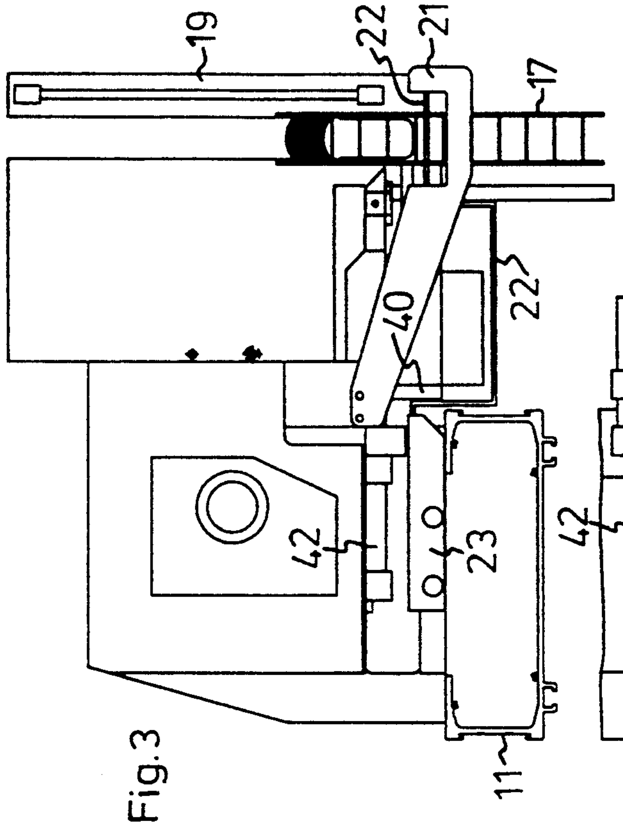
FIG. 3 is a cross-sectional view along the line III—III in FIG. 2.
Figure 4:
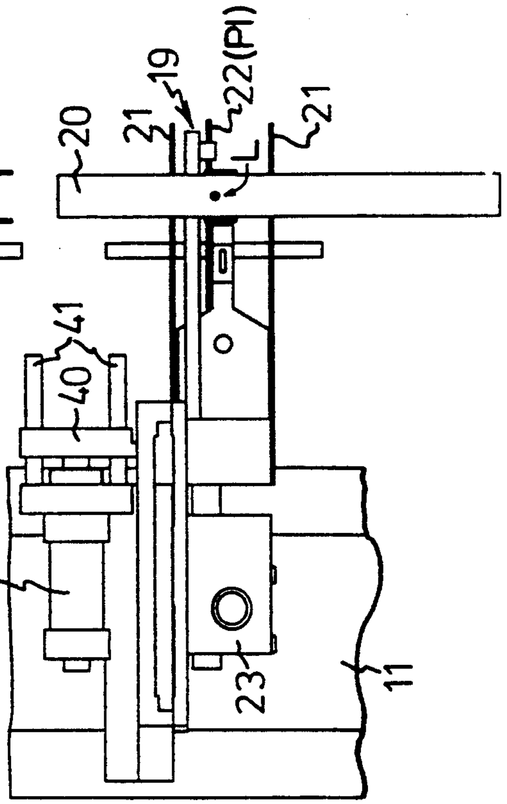
FIG. 4 is a top plan view of the stations according to FIGS. 2 and 3, FIGS. 5, 6 and 7 are the same views as FIGS. 2–4, however illustrating the punching tool in its operative position.
Figure 2:
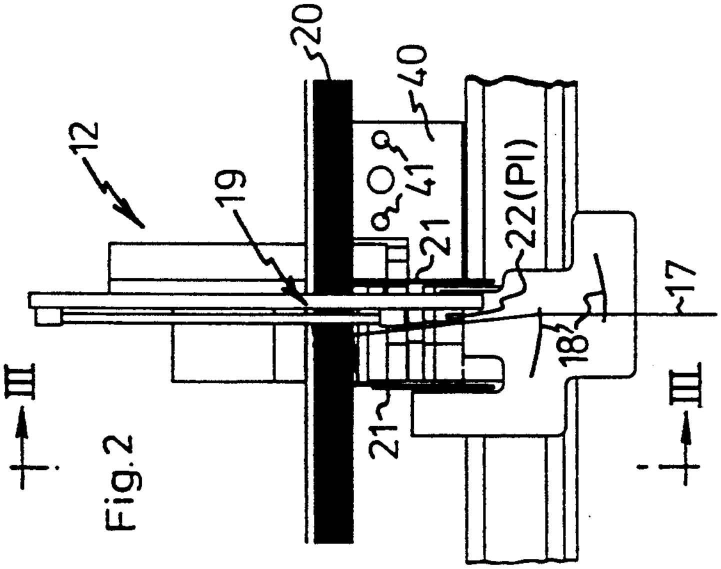
FIG. 2 illustrates in more detail a ladder tape threading station and a punching station in the venetian blind production machine.
Figure 9:
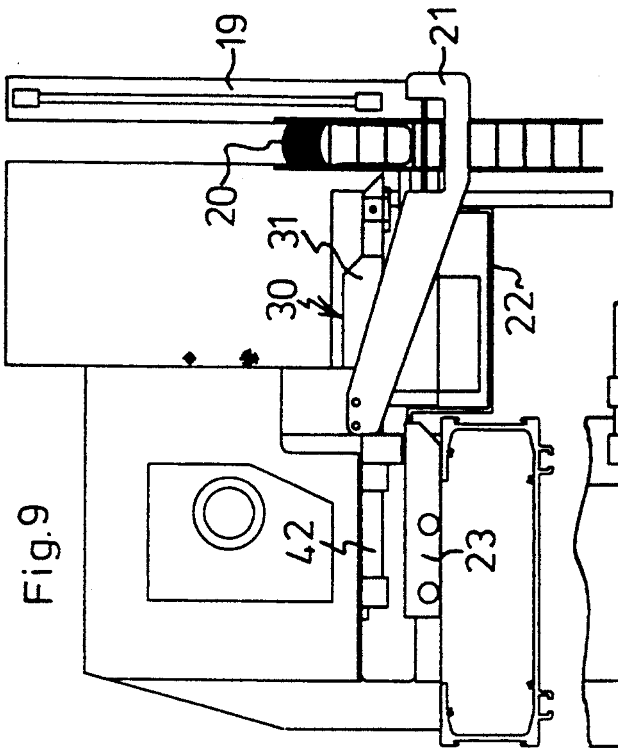
FIGS. 8, 9 and 10 are the same views as FIGS. 2–7, however illustrating the tool in its inoperative position.
Figure 10:
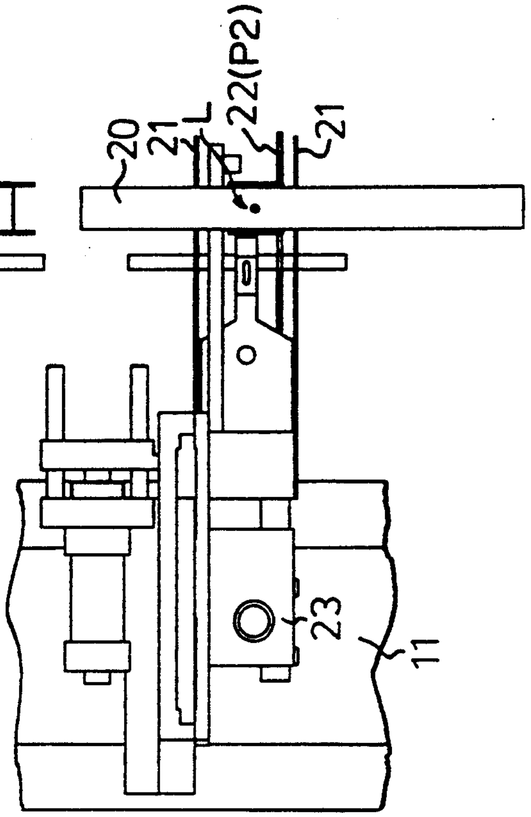
Figure 8:
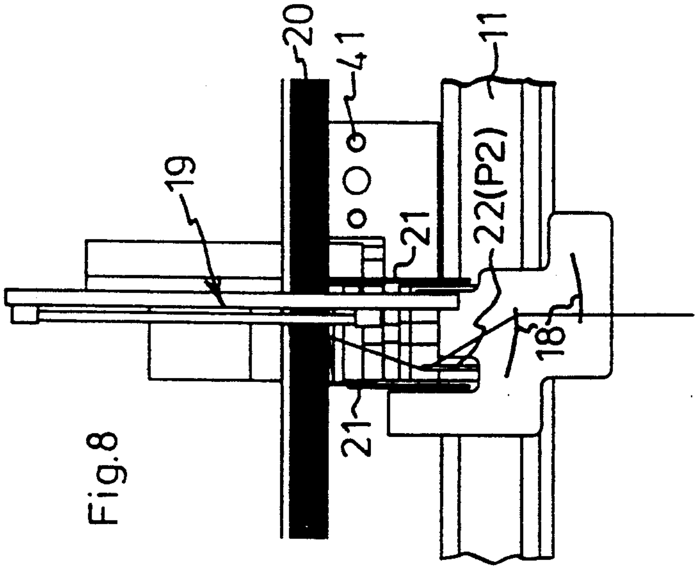

FIGS. 2–4 illustrate a ladder tape threading station which is included in the venetian blind mounting station and which is combined with a punching station. In the embodiment shown, use is made of a ladder tape folding mechanism and a slat retaining mechanism of the type disclosed in the above-mentioned Swedish Patent Specification SE-B-441,941. As is apparent, the ladder tape 17 is supplied from below and passes clamping means 18 on its way up to the actual threading station and to a store 19 in which slats 20 which have already been passed through the ladder tape are retained. After threading and separating the slats, they are raised or lifted by a lifting means 21 towards the lower side of the slats already in the store 19. The slats are then retained in the store in a conventional manner. For folding the ladder tape, use is made of a ladder tape guide 22 which is moved sideways between one position as shown in FIGS. 2–4, and another position as shown in FIGS. 8–10. The moving of the ladder tape guide 22 is effected in that this is movably mounted and is driven back and forth between two positions P1, P2 spaced along the path of the slat material (see, e.g., FIGS. 2 and 8, and FIGS. 4 and 9) by means of a drive mechanism 23. Thus the ladder tape guide 22 sees to it that the rungs of the ladder tapes are placed alternatively on one and the other side of the lift cord holes of the different venetian blind slats 20.

Figure 12:
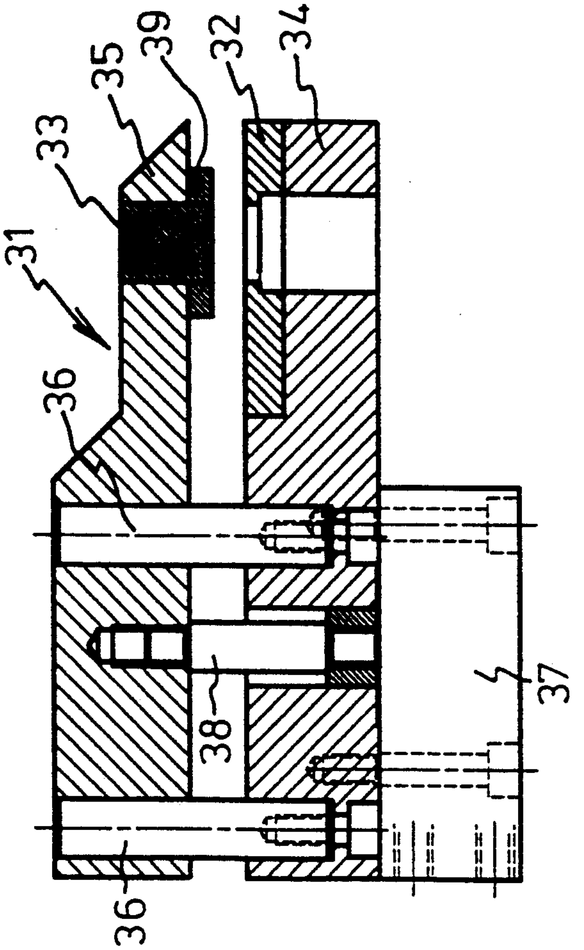
FIG. 12 is cross-sectional view along the line XII—XII in FIG. 11.
Figure 13:
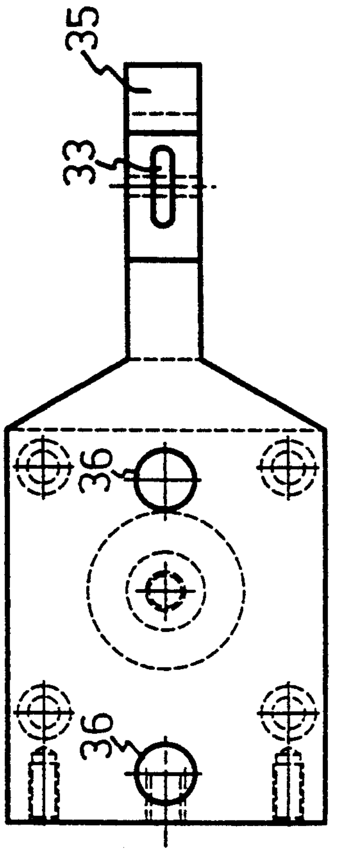
FIG. 13 is a top plan view of the tool in FIGS. 11 and 12.
Figure 11:
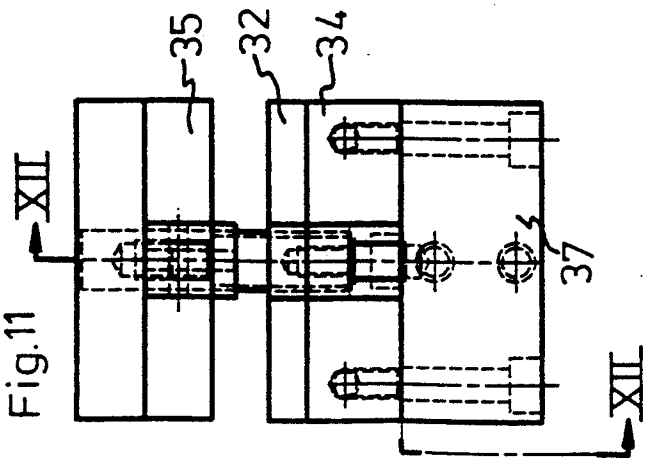
FIG. 11 is an end view of an embodiment of the tool according to the present invention.

According to the invention, the venetian blind production machine comprises a punching device which is generally designated 30. The punching device comprises a punching tool 31 having two hole-forming elements, namely a die 32 and a punch 33. The design of the tool, which is shown as an example, is evident from FIGS. 11–13. The die 32 is arranged on a lower holder 34, while the punch 33 is arranged on an upper holder 35. The upper holder 35 is guided to move towards and away from the lower holder 34 by means of guide pins 36. The punching movement is accomplished by a driving motor 37 which is mounted under the tool and which can be, for example, a pneumatic or hydraulic motor, but which also can be a mechanical driving element. The driving motor 37 moves a connecting rod 38 upwards and downwards for operating the upper tool holder 35. For retaining punched out material there is provided an elastomer ring 39 which is mounted around the punch 33 on the lower side of the tool holder 35.

Figure 6:
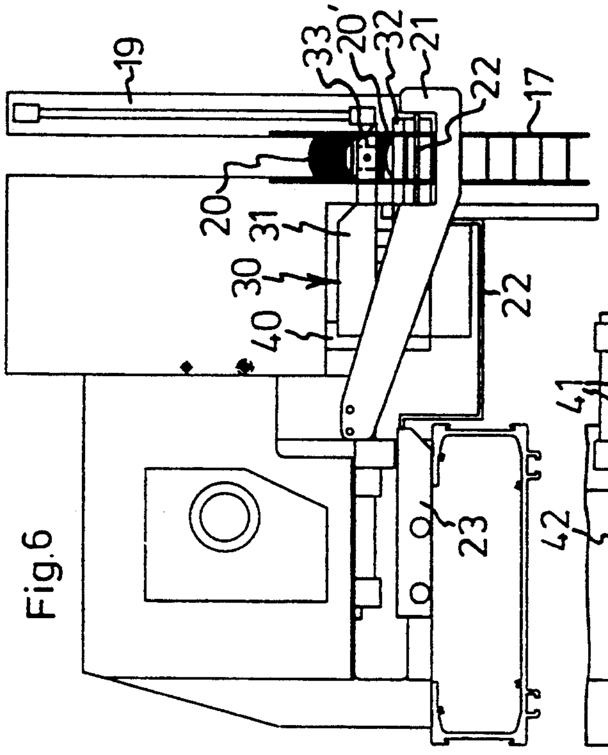
Figure 7:
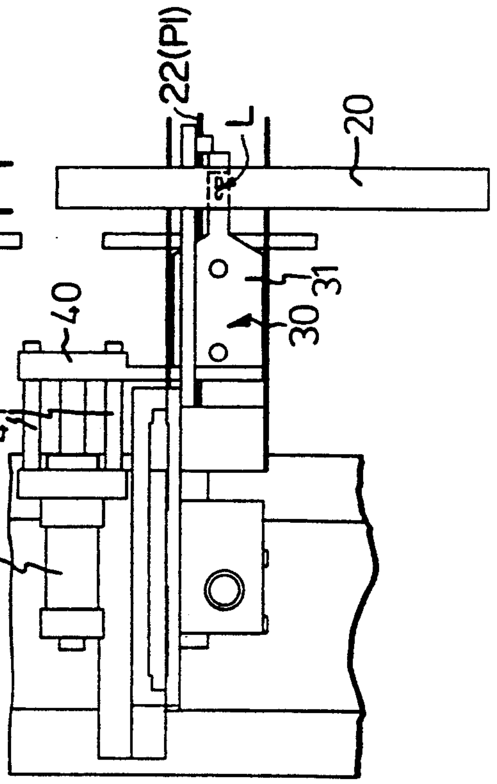
Figure 5:
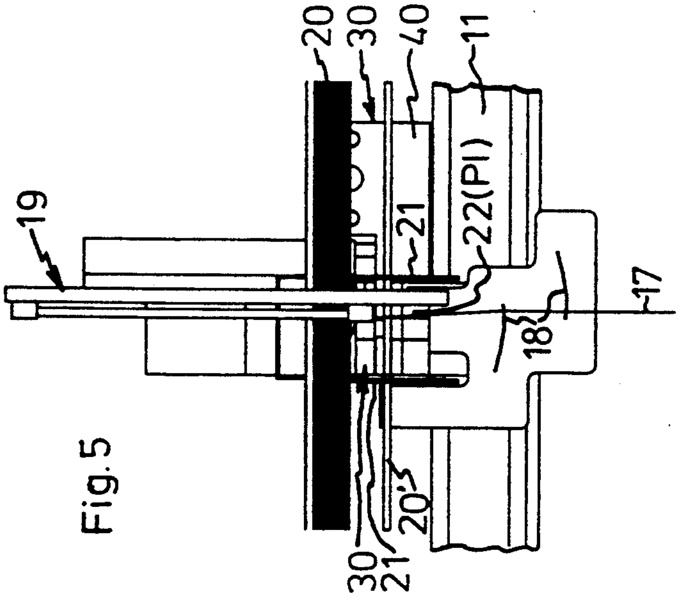

The tool 30 is mounted on a tool holder 40 which is reciprocable along guides 41 (which, as shown, are substantially perpendicular of the path of the slat material) under the action of a driving motor which in the embodiment illustrated has the form of a piston-and-cylinder assembly 42. The tool can thus be moved between an operative position as illustrated in FIGS. 5–7 and an inoperative position as shown in FIGS. 2–4 as well as in FIGS. 8–10. As will be seen from these figures, in the operative tool position the punch and die are aligned with the path of the slat material along a line L which extends between the tw positions of the ladder tape guide 22. Owing to this movability, the tool can be pulled out laterally from the area of the strip of slat material 15, when this is to be moved lengthwise or raised to the store 19 after the individual slat has been cut. By this arrangement, the bed of the machine can be shortened to substantially half its length, while maintaining the same production capacity of the machine.

In the embodiment of the invention as illustrated in FIGS. 3–13, the tool is designed to perform a translational motion transversely of the direction of travel of the strip of slat material.

Figure 14:
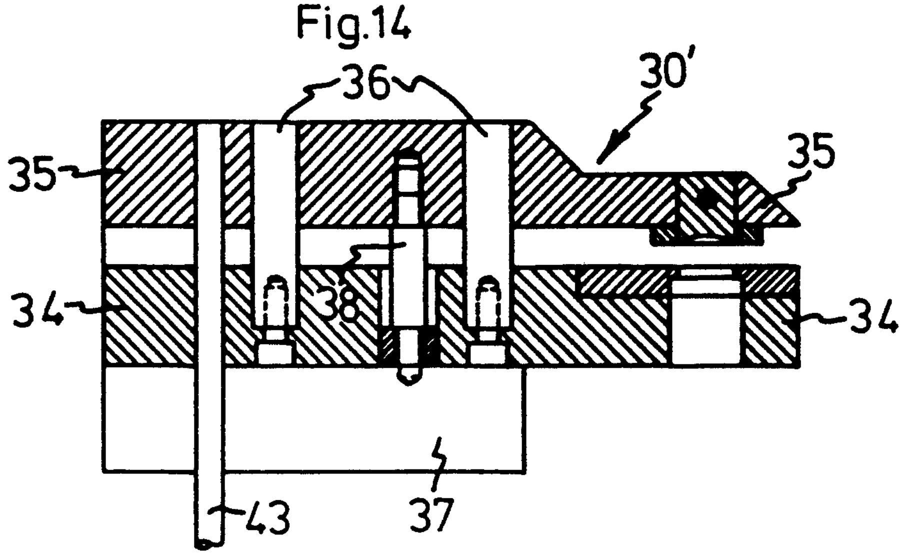
FIG. 14 is a view corresponding to FIG. 12, illustrating a further embodiment of the tool according to the invention.
Figure 15:
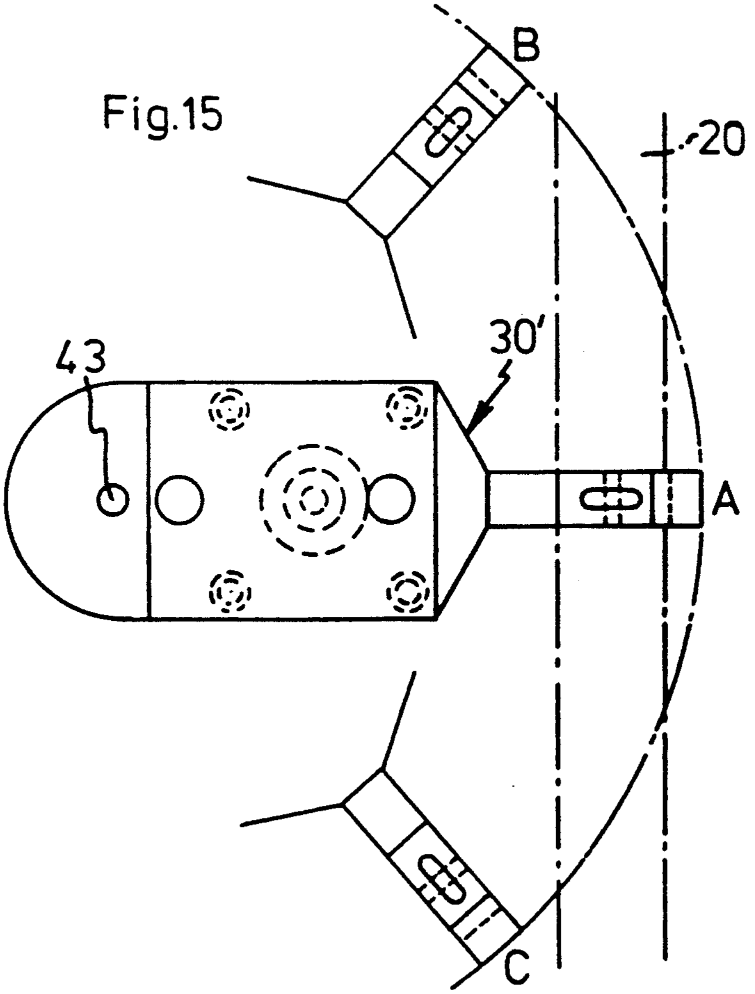
FIG. 15 is a top plan view of the tool in FIG. 14.

The principles of the invention may, however, also be used for other motions of the tool. FIG. 14 illustrates an embodiment of a tool 30′ which is nonrotatably connected to a journal 43 by means of e.g. wedge joints. The journal 43 is in turn connected to a driving motor (not shown) for pivoting the tool 30′ between an operative position A and an inoperative position B or an inoperative position C. In the positions B and C, the tool is located laterally outside the path of the strip of slat material 15. While using a pivotable tool, the pivoting movement may also be coordinated with the movement of the ladder tape folding mechanism 22, 23 and, optionally, the actual folding of the ladder tape can be accomplished by the punching tool itself or by some projection formed thereon. In the embodiment shown in the drawing, the tool comprises two punching tools which are arranged at an angle of 180° to one another. The same principle may be used for a number of tools, for example three or four, which are distributed equiangularly around the journal 43. In the embodiment shown, the pivoting occurs about a vertical axis. The pivoting can also occur about a horizontal axis, the tool being mounted on an arm whose one end is mounted on a horizontal journal and whose other end carries the tool for moving it, while the pivoting of the arm is limited, from its operative to its inoperative position, and vice versa.

Figure 16:
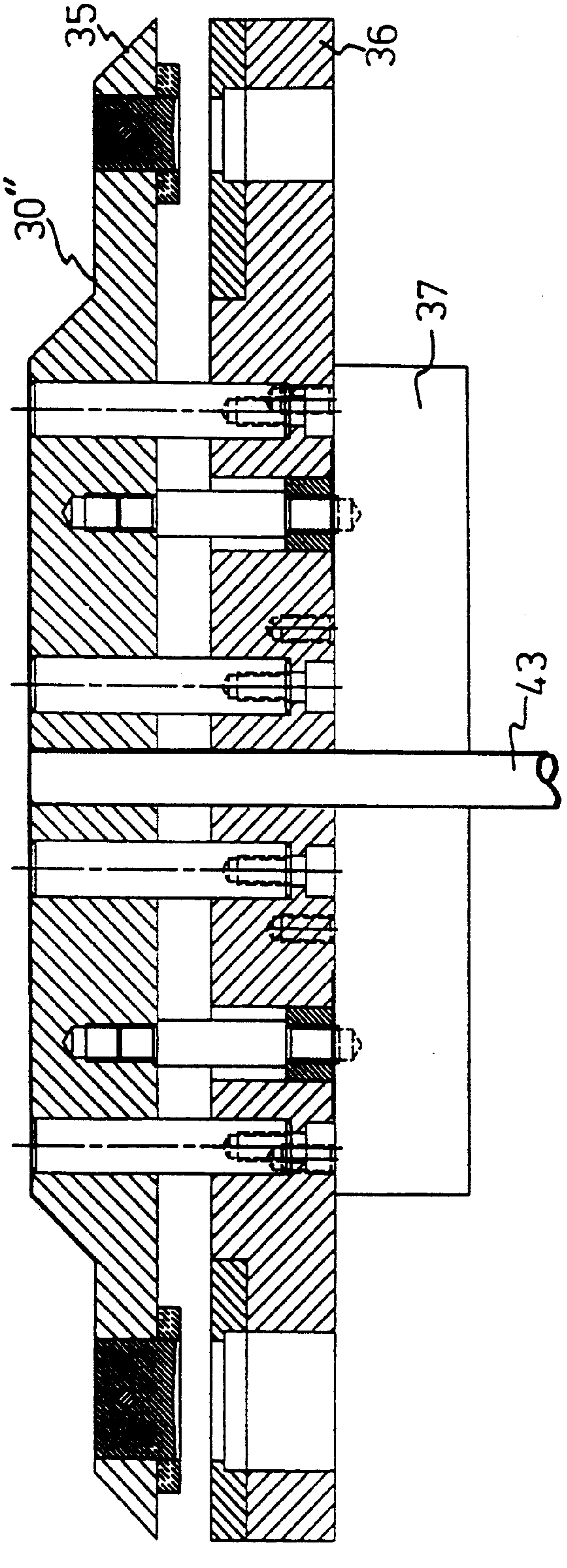
FIG. 16 is a cross-sectional view, corresponding to FIG. 12, of a different embodiment of the tool according to the present invention.
Figure 17:
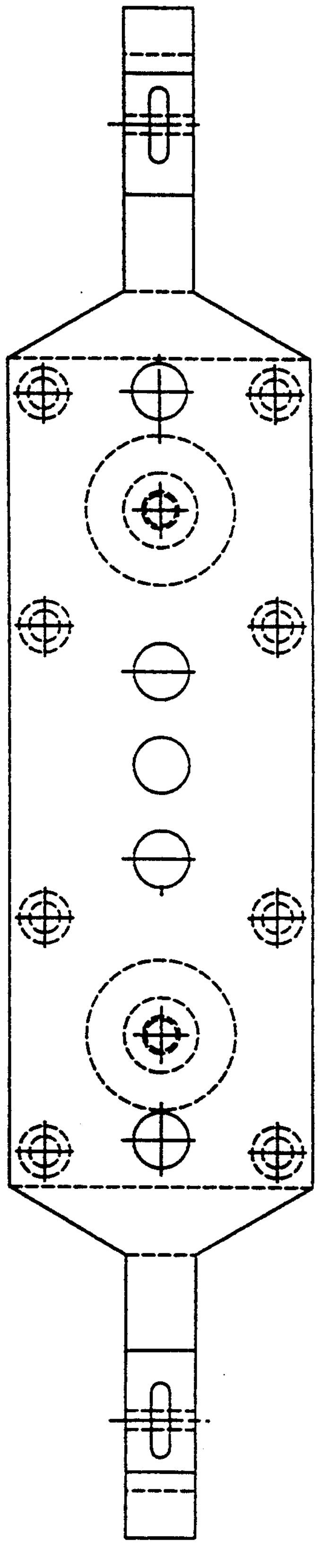
FIG. 17 is a top plan view of the tool in FIG. 16.

FIGS. 16 and 17 illustrate a further embodiment of the punching tool according to the invention. In this case, the tool is doubled, thus having a die and punch at both ends. This embodiment may be used to facilitate quick shifting between different widths of the strip of slat material.

Figure 19:
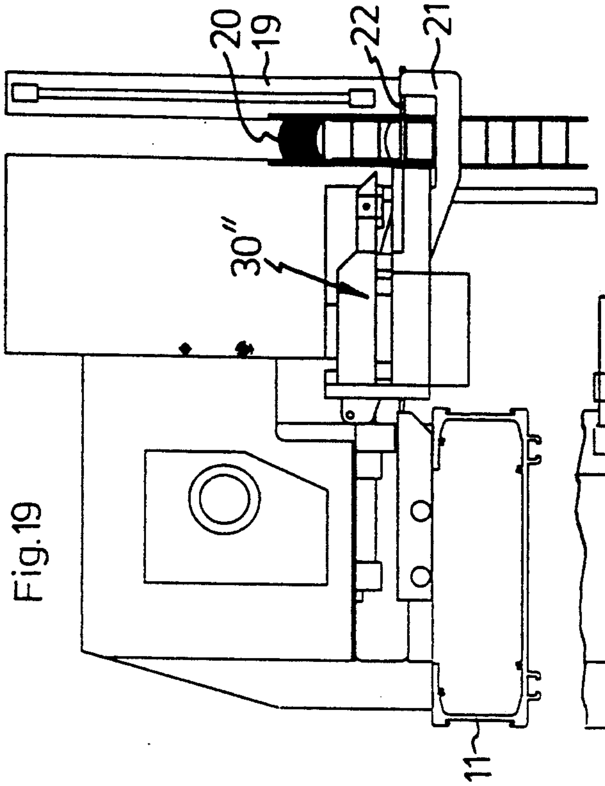
FIG. 19 is a cross-sectional view along the line XIX—XIX in FIG. 18.
Figure 20:
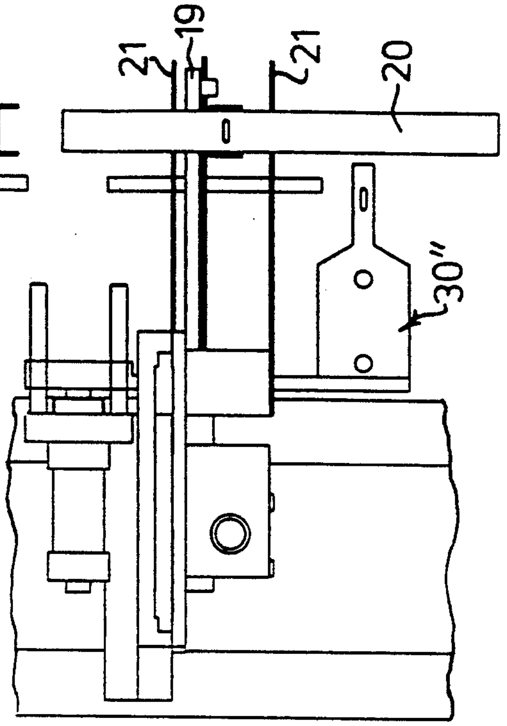
FIG. 20 is a top plan view of the machine according to FIGS. 18 and 19, FIGS. 21, 22 and 23 are the same views as FIGS. 18–20, however illustrating the punching tool in its operative position.
Figure 18:
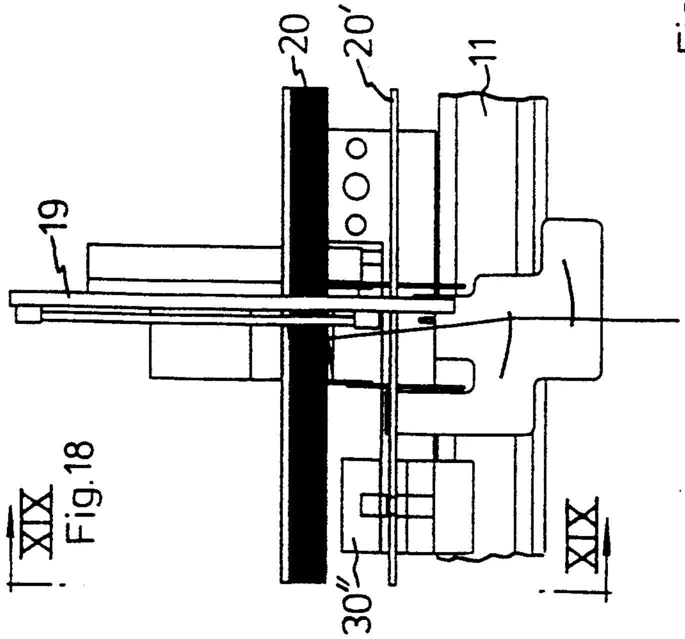
FIG. 18 is an end view of a further embodiment of the venetian blind production machine according to the present invention, the tool being shown in its inoperative position.
Figure 22:
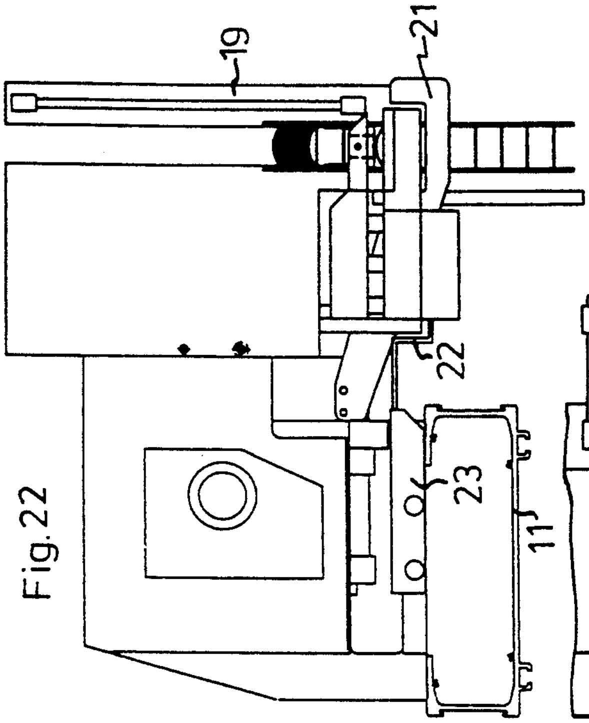
Figure 23:
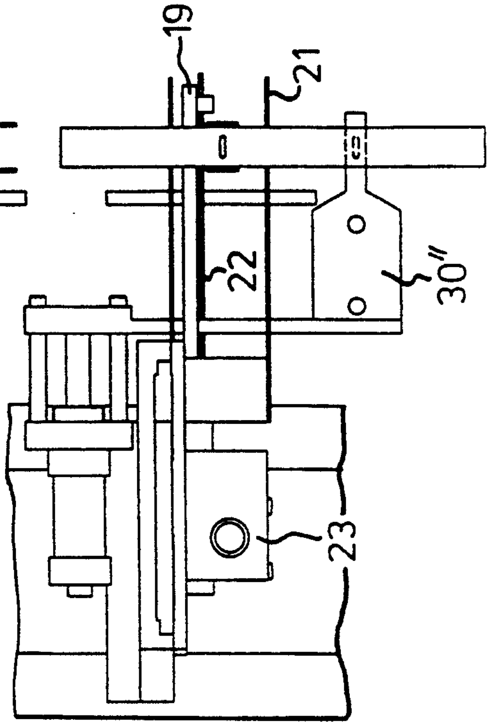
Figure 21:
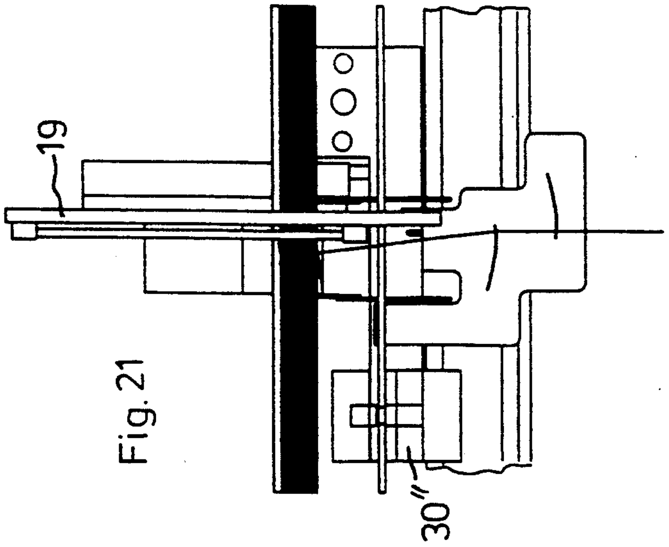

FIGS. 18–20 and 21–23, respectively, illustrate a further embodiment of a venetian blind production machine according to the present invention. FIGS. 18–20 illustrate the punching tool in its inoperative position, and FIGS. 21–23 in its operative position. In these Figures, the same reference numerals are used for the same parts as in the embodiments described above. The difference between this embodiment and those described above resides in the positioning of the punching tool 30" which is used to punch the lift cord holes in the strip of slat material. As shown in the Figures, this punching tool is positioned adjacent the actual threading station, but inside the slat mounting station. When using this embodiment of the invention, the feeding of the strip of slat material is temporarily stopped at the punching tool 30" for punching the lift cord holes, before the strip of material is advanced to the final mounting position. In this embodiment, use is preferably made of a punching tool at each threading station.

Figure 25:
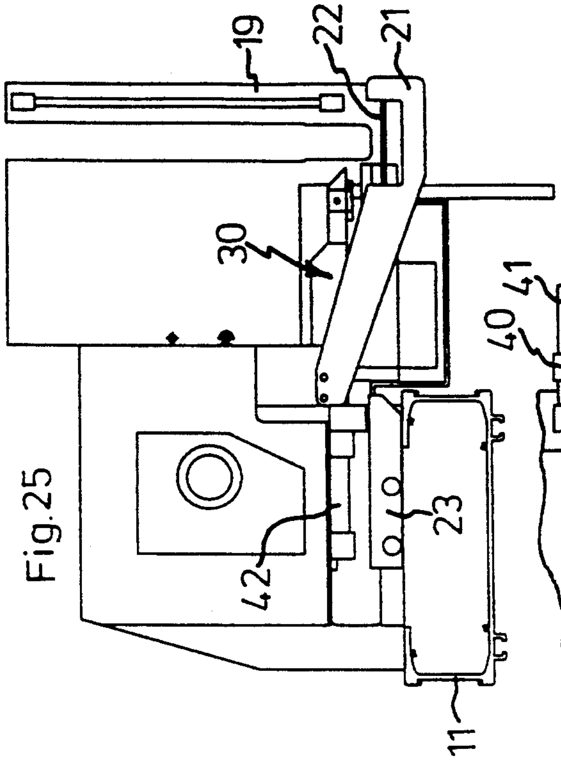
FIG. 25 is a cross-sectional view along the line XXV—XXV in FIG. 24.
Figure 26:
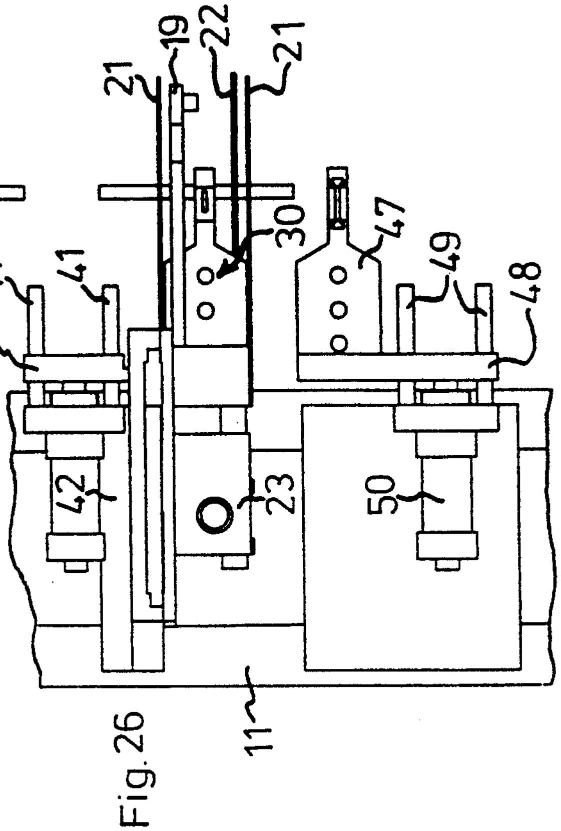
FIG. 26 is a top plan view of the machine according to FIGS. 24 and 25.
Figure 24:
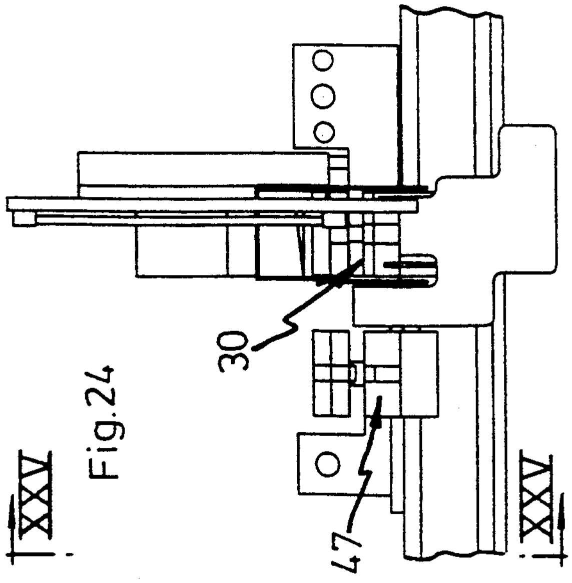
FIG. 24 is an end view of a further embodiment of the venetian blind production machine according to the invention.

FIGS. 24–26 illustrate one more embodiment of the venetian blind production machine according to the invention. This embodiment distinguishes from the one in FIGS. 2–10 merely regarding the presence of a cutoff or separating punching tool 47 which is mounted on a tool holder 48. This tool holder is reciprocable along guides 49 under the action of a driving motor which also in this case has the form of a piston-and-cylinder assembly 50. The Figures show the tool in its inoperative position, but like the tools 30, 30' and 30" described above, this tool can be moved forwards to an operative position in which it can cut a slat 20 from the intermittently supplied strip of slat material 15. This cutting operation is suitably effected at the same time as the lift cord hole is punched by means of the punching tool 30. The cutoff or separating punching tool 47 can suitably be designed as described in the above-mentioned Swedish Patent SE-B-441,941.

As is evident from what has been, described above, the invention provides a venetian blind production machine and a punching device which permit a considerable shortening of the machine bed, thereby making it possible to use the machine more efficiently. The invention may be used either to shorten the machine bed or to double the capacity of the machine according to the principles described in the above-mentioned Swedish Patent SE-B-441,941.

I claim:

1. A machine for producing venetian blinds, comprising a plurality of ladder tape threading stations disposed at spaced locations along a machine bed, means for intermittently advancing a strip of venetian blind slat material longitudinally of said strip along a predetermined path into respective ladder tapes of said ladder tape threading stations, and a plurality punching devices each including punching tool having a punch and a die for punching lift cord holes in said slat material and moving means for moving said punching tool between an operative position in which said punch and die are aligned with said path for lift cord hole punching and an inoperative position in which said punch and die are disposed legally of said path.

2. A machine according to claim 1, wherein a respective one of said punching devices is mounted near each sad ladder tape threading station.

3. A machine according to claim 2, wherein each said ladder tape threading station includes ladder tape guide means displaceable between two positions spaced along said path for positioning rungs of the corresponding ladder tape at opposite sides of lift cord holes punched by the corresponding punching tool.

4. A machine according co claim 3, wherein, in the operative position of said corresponding punching tool, said punch and die thereof are disposed on a lien which extends between said two positions of said ladder tape guide means.

5. A machine according to claim 4, wherein each said punching tool is moved by its corresponding moving means substantially perpendicularly toward said path to its operative position and substantially perpendicularly away from said path to its inoperative position.

6. A machine according to claim 2, wherein each said punching tool is moved pivotally by its corresponding moving means between its operative and inoperative positions.

7. A machine according to claim 2, wherein each said ladder tape threading station includes folding means movable for folding the corresponding ladder tape, and wherein the movement of each punching tool between its operative and inoperative positions is coordinated with the movement of the corresponding folding means.

8. A machine according to claim 7, wherein said punching tools are moved pivotally between their operative and inoperative positions.

9. A machine according to claim 1, in which a respective one of said punching devices is mounted adjacent to each ladder tap threading station, in advance thereof along said path.

10. A machine according to claim 1, further comprising separating means including a separating punching tool having a die and a punch for cutting slats from said strip of salt material and means or moving said separating punching tool between an operative position, in which said die and punch thereof are aligned with said path for punching said slat material to cut the same, and an inoperative position in which said die and punch thereof are disposed laterally of said path.

11. A machine according to claim 1, wherein said moving means moves said punching tool translationally between said operative and inoperative positions.

12. A machine according to claim 1, wherein said moving means moves said punching tool pivotally between said operable and inoperative position.

13. A machine for producing venetian blinds comprising a plurality of ladder tape threading stations disposed at spaced location along a machine bed, means for intermittently advancing a strip of venetian bland slat material longitudinal of said strip along a predetermined path into respective ladder tapes of said ladder tape threading stations, and punching means including a plurality of punching tool elements for using said slat material and means for moving at least one of said tool elements between an operative position in which said one element is aligned with said path for the punching of said least material and an inoperative position in which said one element is disposed laterally of said path.

14. A machine according to claim 13, wherein said punching means punches lift cord holes in said slat material.

15. A machine according to claim 14, wherein said one element is moved translationally between its operative and inoperative positions.

16. A machine according of claim 14, wherein said one element is moved pivotally between its operative and inoperative positions.

17. A machine according to claim 14, wherein a respective said punching means is mounted near each said ladder tape threading station.

18. A machine according to claim 17, wherein each said ladder tape threading station includes folding means movable for folding the corresponding ladder tape and wherein the movement of id one element of each punching means is coordinated with the movement of the corresponding folding means.

19. A machine according to claim 14, further comprising separating means or cutting slat from said strip of slat material and means for moving an element of said separating means between an operative position aligned with said path for cutting said slat material and an inoperative position disposed lateraly of said path.

20. A machine according to claim 13, wherein said one element is moved translationally between its operative and inoperative positions.

21. A machine according of claim 13, wherein said one element is moved pivotally between its operative and inoperative positions.

22. In a machine for producing venetian blinds in which a strip of slat material is advanced longitudinally of said strip along a predetermined path, a punching device for punching said slat material, said punching device comprising a punching tool having a punch and a die, and moving means for moving said punching tool between an operative position in which said punch and die are aligned with said path for punching said slat material and an inoperative position in which said punch and die are disposed laterally of said path.

23. A punching device according to claim 22, wherein said punching tool punches lift cored holes in said slat material.

24. A punching device according to claim 23, wherein said moving means moves said punching tool translationally between its operative and inoperative positions.

25. A punching device according to claim 23, wherein said moving means moves said punching tool pivotally between its operative and inoperative positions.

* * * * *